United States Patent [19]

Sauger

[11] 4,125,891

[45] Nov. 14, 1978

[54] ARRANGEMENT FOR PROTECTING DATA STORED IN A DIGITAL COMPUTER

[75] Inventor: Guy G. Sauger, Nogent/Marne, France

[73] Assignee: Cii Honeywell Bull (Compagnie Internationale pour L'informatique), Paris, France

[21] Appl. No.: 720,209

[22] Filed: Sep. 3, 1976

[30] Foreign Application Priority Data

Sep. 5, 1975 [FR] France .................. 75 27283

[51] Int. Cl.² .............................................. G06F 5/02
[52] U.S. Cl. ................................................... 364/200
[58] Field of Search ................ 340/172.5; 445/1; 364/200 MS, 300

[56] References Cited

U.S. PATENT DOCUMENTS

| | | | |
|---|---|---|---|
| 3,786,427 | 1/1974 | Schmidt et al. | 340/172.5 |
| 3,902,163 | 8/1975 | Amdahl et al. | 340/172.5 |
| 3,902,164 | 8/1975 | Kelly et al. | 340/172.5 |
| 3,916,385 | 10/1975 | Parmar et al. | 340/172.5 |

OTHER PUBLICATIONS

Reference Manual-A22-6528-3-IBM 7090 Data Processing System-1961-pp. 115-127-White Plains, N.Y.
Radix Conversion in a Hexadecimal Machine-Apr. 1964-Orville Goering(L7140-2109)-IEEE Transactions on Electronic Computers-pp. 154-155.

*Primary Examiner*—Harvey E. Springborn
*Attorney, Agent, or Firm*—Lowe, King, Price & Becker

[57] ABSTRACT

A memory space for storing computer instructions includes first and second groups of addresses for first and second types of computer instructions. The first and second groups of addresses are numbers in first and second bases, respectively. The memory space is addressed with signals representing numbers only in the second base. All of the addresses of the first base are expressed by numbers that form only some of the numbers of the second base. In response to an indication of the first type of computer instruction being read out of or into the memory, the addresses of the first base are converted into addresses of the second base.

7 Claims, 4 Drawing Figures

|    | 0  | 1  | 2  | 3  | 4  | 5  | 6  | 7  | 8  | 9  | 10 | 11 | 12 | 13 | 14 | 15 |
|----|----|----|----|----|----|----|----|----|----|----|----|----|----|----|----|----|
| 0  | 00 | 01 | 02 | 03 | 04 | 05 | 06 | 07 | 08 | 09 |    |    |    |    |    |    |
| 1  | 0A | 0B | 0C | 0D | 0E | 0F | 10 | 11 | 12 | 13 |    |    |    |    |    |    |
| 2  | 14 | 15 | 16 | 17 | 18 | 19 | 1A | 1B | 1C | 1D |    |    |    |    |    |    |
| 3  | 1E | 1F | 20 | 21 | 22 | 23 | 24 | 25 | 26 | 27 |    |    |    |    |    |    |
| 4  | 28 | 29 | 2A | 2B | 2C | 2D | 2E | 2F | 30 | 31 |    |    |    |    |    |    |
| 5  | 32 | 33 | 34 | 35 | 36 | 37 | 38 | 39 | 3A | 3B |    |    |    |    |    |    |
| 6  | 3C | 3D | 3E | 3F | 40 | 41 | 42 | 43 | 44 | 45 |    |    |    |    |    |    |
| 7  | 46 | 47 | 48 | 49 | 4A | 4B | 4C | 4D | 4E | 4F |    |    |    |    |    |    |
| 8  | 50 | 51 | 52 | 53 | 54 | 55 | 56 | 57 | 58 | 59 |    |    |    |    |    |    |
| 9  | 5A | 5B | 5C | 5D | 5E | 5F | 60 | 61 | 62 | 63 |    |    |    |    |    |    |
| 10 |    |    |    |    |    |    |    |    |    |    |    |    |    |    |    |    |
| 11 |    |    |    |    |    |    |    |    |    |    |    |    |    |    |    |    |
| 12 |    |    |    |    |    |    |    |    |    |    |    |    |    |    |    |    |
| 13 |    |    |    |    |    |    |    |    |    |    |    |    |    |    |    |    |
| 14 |    |    |    |    |    |    |    |    |    |    |    |    |    |    |    |    |
| 15 |    |    |    |    |    |    |    |    |    |    |    |    |    |    |    |    |

ARRANGEMENT FOR PROTECTING DATA STORED IN A DIGITAL COMPUTER

FIELD OF THE INVENTION

The present invention relates to data-processing systems and more particularly to apparatus for protecting stored date by providing memory addresses for different computer functions with numbers having differing bases.

BACKGROUND OF THE INVENTION

A wide variety of techniques are known which make it possible to prevent mistakes made by a user from upsetting the contents of computer memory areas not allocated to him. In effect, if it is to be guaranteed that processing will be properly carried out, it is necessary that deliberate or inadvertent errors made by any user should not destroy the information in the processing system or in the programs or data belonging to other users. Thus, there is a prior art arrangement wherein a protective bit is inserted in a store word and access to a given memory block (for read-in for example) is possible only if the protective bit is a zero. In another prior art technique, every block in the memory has a protective lock associated with it. In another technique, two limit registers are respectively loaded with the first and last addresses in a program when a program is initiailly being put into operation; all memory references of the program must be contained between these two addresses. Also, memory pagination techniques exist in which protection is automatically provided between independent programs by converting a virtual address into an actual address. When known pages are shared among a number of users, the key protection system is often used.

There are generally two modes in which the computer can operate, namely (1) in a master or supervisory mode in which any instructions are permitted and the whole memory is addressable; and (2) a slave or user-program mode in which privileged instructions, i.e., input/output instructions, interruptions, interrupt-off, interrupt-on, and memory protection monitoring, are forbidden and memory protection is effective. In the slave mode, the computer is under the control of a user program, and at each interruption it reverts to the master mode.

There is also a technique for protecting data wherein concentric rings group together sets of procedures when multi-programming techniques are used. In this ring concept, the user of the lowest numbered ring has direct access to a higher numbered ring, but users of higher numbered rings can only gain access to the data in lower numbered rings in a specific, indirect manner. The development of this technique is described in an article entitled "Access Control of the Multics Virtual Memory," published by Honeywell Information Systems Inc., in Multics study no. AG96, Rev. O, June, 1972.

BRIEF DESCRIPTION OF THE INVENTION

An object of the present invention is to provide a novel system for protecting data stored in a computer memory, wherein data are safeguarded between users of the memory while the processing system is protected from the deliberate or inadvertent actions of users and peripherals.

The object is attained by providing a data protection system wherein addressing of the instructions in a program belonging to a user or a supervisor in a read/write memory takes place in an arithmetic base differing from that used for the microinstructions in the remaining microprograms of the operating system, and wherein a subdivision of the read/write memory contained within precisely defined limits is reserved for each user and for the supervisor.

The invention will be better understood from the following description, which refers to the accompanying drawings.

BRIEF DESCRIPTION OF THE DRAWINGS

FIGS. 3A and 3B are illustrations of the coding techniques and apparatus of a binary to hexadecimal transcoder illustrated in FIG. 2.

DETAILED DESCRIPTION OF THE DRAWINGS

Figure 1:
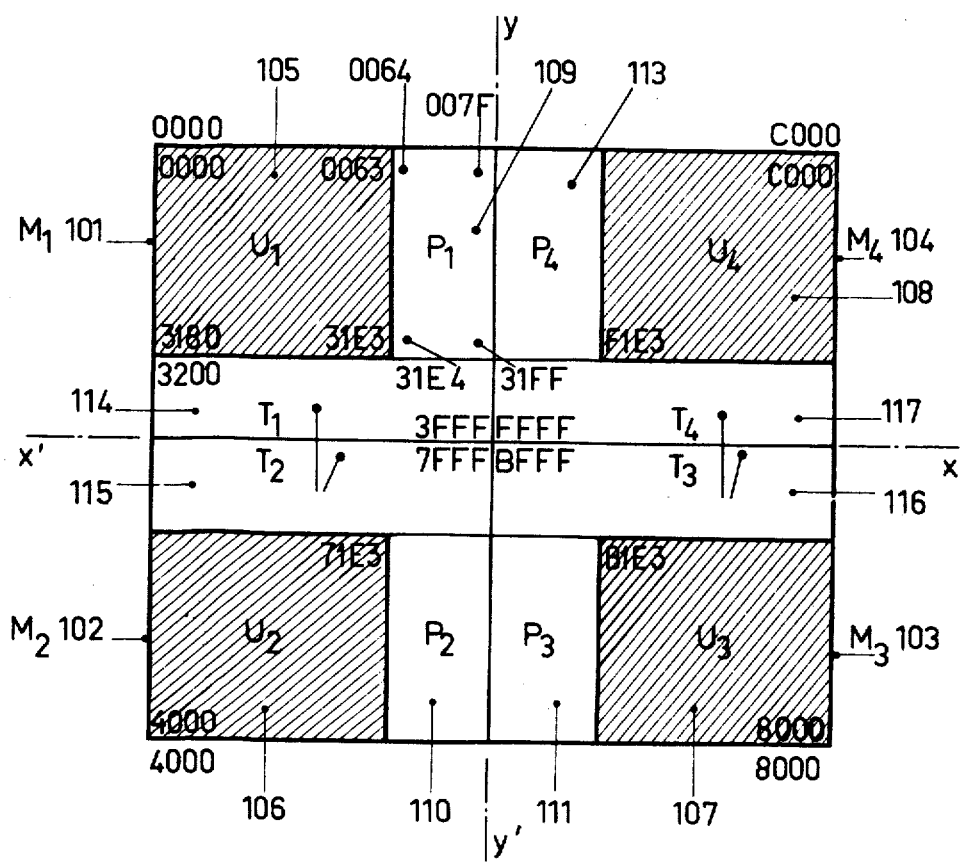
FIG. 1 is a schematic illustration of a set of subdivisions of a read/write memory shared amongst three users and a supervisor.

In FIG. 1 there is illustrated a read/write computer instruction memory including four memory spaces $M_1 101$, $M_2 102$, $M_3 103$ and $M_4 104$; the spaces are separated by axes $x'x$, $y'y$. In the exemplary memory of FIG. 1, each memory space has a nominal capacity of 16,000 words. Each memory space is defined by a matrix having 128 address rows and 128 address columns; at each address of the matrix an instruction word is stored. Each instruction word may consist of one or several bits. In one exemplary memory, each space includes 64 integrated circuit, flip flop SN54S200 memories (as manufactured by Texas Instruments), each of which includes 256 one bit addressable memory locations. Each memory space is addressed in numerical base 16 (hexadecimal code wherein the decimal digits 0, 1, 2, 3, 4, 5, 6, 7, 8, 9, 10, 11, 12, 13, 14 and 15 are respectively represented as 0, 1, 2, 3, 4, 5, 6, 7, 8, 9, A, B, C, D, E and F) so that lines 0, 99, 100 and 127 of space $M_1 101$ respectively extend from addresses 0000 to 007F, from 0080 to 00FF, from 3180 to 31FF, from 3200 to 327F, and from 3F80 to 3FFF. Space $M_1 101$ is defined by addresses, in numerical base 16, extending from address 0000 to address 3FFFF. Space $M_2 102$ is defined, in numerical base 16, by addresses 4000 to 7FFF; space $M_3 103$ is defined in the numerical base 16, by addresses 8000 to BFFF; and space $M_4 104$ is defined, in numerical base 16, by addresses C000 to FFFF.

In each of the memory spaces $M_1 101$, $M_2 102$, $M_3 103$ and $M_4 104$, there is a subdivision, respectively denominated by $U_1 105$, $U_2 106$, $U_3 107$ and $U_4 108$ having 10,000 addressable one bit words. In general, subdivision $U_1 105$ is reserved for supervisory instructions for a computer with which the memory is employed, i.e., of which it is a portion, while subdivisions $U_2 106$, $U_3 107$ and $U_4 108$ are reserved for user instruction programs. Since each of the subdivisions includes 10,000 words, subdivision $U_1 105$ is defined by a square having addresses of 0000, 0063, 31E3, and 3180 at its apices. The remainder of memory space $M_1 101$ is occupied by a working zone $P_1 109$, reserved for microprograms of the computer operating system, and by a zone $T_1 119$, reserved for instructions involving dialogues between the computer and peripherals, as well as code-conversion tables and storage buffers. Working zone $P_1 109$ is defined by a rectangle having apices at addresses 0064, 007F, 31FF, and 31EF, while zone $T_1 114$ is defined by a rectangle having apices at addresses 3200, 327F, 3FFF, and 3F80. The memory zones in each of the other memory spaces $M_2 102$, $M_3 103$, and $M_4 104$ are arranged in an identical fashion to the zones in memory space $M_1 101$. In space $M_2 102$, the storage and microprogram zones are respectively denominated as $T_2 115$ and $P_2 110$; in space $M_3 103$ are found zones $P_3 111$ and $T_3 116$; in space $M_4 104$ are found zones $P_4 113$ and $T_4 117$.

The read/write memory of FIG. 1 is always addressed by its addressing mechanism in the hexadecimal system, but instructions to the user and supervisory zones $U_1 105$, $U_2 106$, $U_3 107$, and $U_4 108$ are written in the decimal system, as commonly adapted in the GE Computer 58, manufactured by Cii-Honeywell Bull Company, and which has been on sale since 1969. The apparatus of the present invention converts an instruction addressed by a user or supervisor, in decimal, to an instruction which is processed by the memory addressing apparatus in hexadecimal. Since a user or supervisor cannot, therefore, write an address for the working and storage zones (P and T) he cannot upset the contents of these computer areas that are not allocated to him.

Thus, by virtue of the allocation of addresses in the memory spaces, there is no possibility of confusion or interaction between the instructions in a user or supervisory program which are stored in subdivisions U and microinstructions stored in zones P. Similarly, the precise definition of zones T by hexadecimal addresses obviates any possibility of the data stored in these zones interacting with the instructions in subdivisions U or with microinstructions contained in working zones P. Precautions must, of course, be taken for the eventuality of an instruction in a user program being addressed outside a memory subdivision. If such an eventuality should occur, the computer functioning in connection with the memory is locked and the instruction program is reinitiated.

Figure 2:
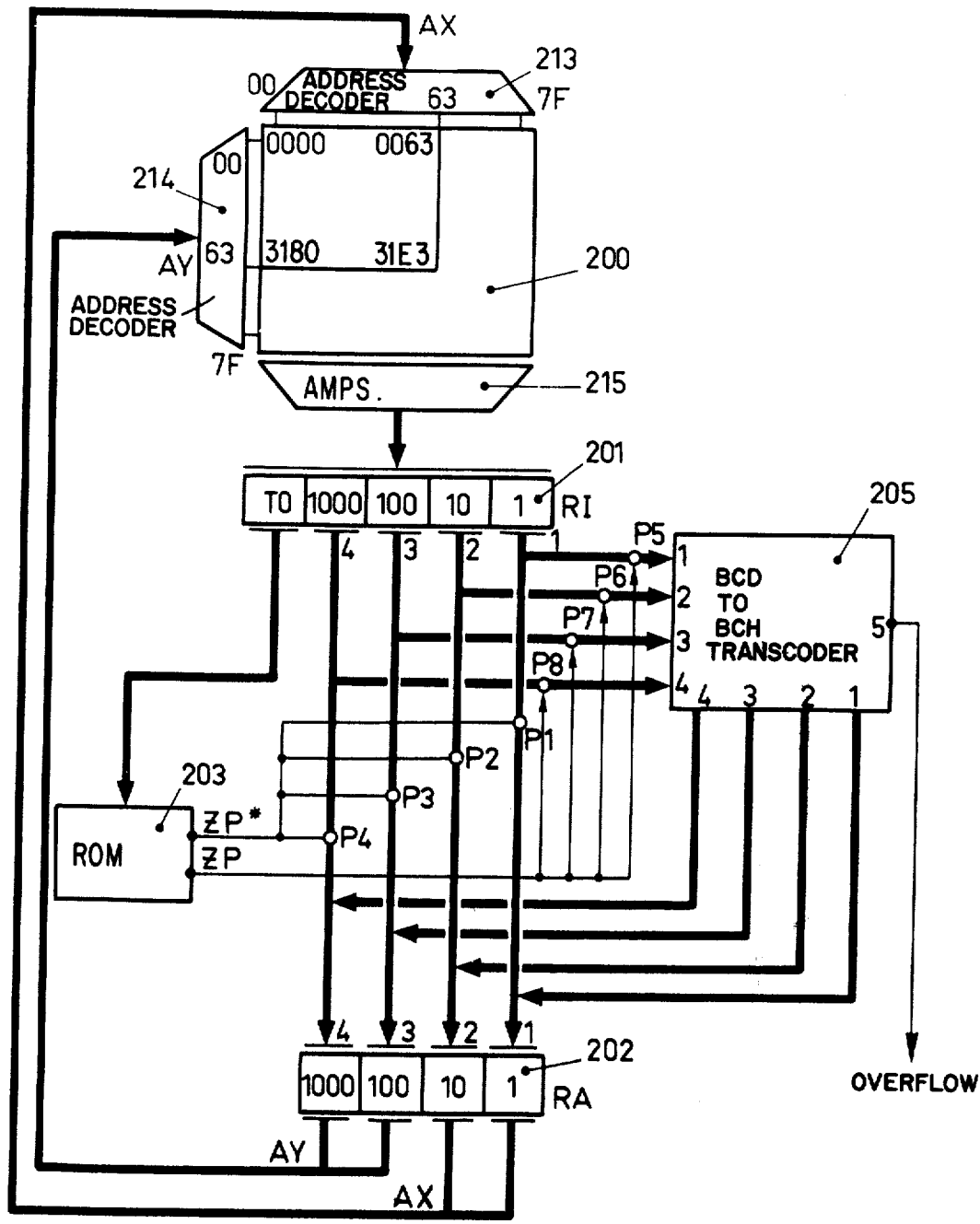
FIG. 2 is a block diagram of an embodiment of the apparatus for addressing a read/write memory in a microprogrammed computer according to the invention.

In FIG. 2, there is illustrated an embodiment of the apparatus for addressing one of the memory spaces $M_1 101$ in accordance with the invention; the memory space illustrated in FIG. 2 bears reference numeral 200. The address of an instruction word for memory space 200 is fed from the computer of which the memory space is a part to register RI201 via driver amplifiers 215. The instruction word may be either in binary coded decimal or hexadecimal form, depending upon what portion of memory space 200 it is used to address. In either event, the address of the instruction word includes four four-bit segments to represent the addresses in memory space 200, as well as a fifth segment having at least four bits, and which indicates the type of operation to be performed. The address instruction word is loaded into register RI201, having five four-bit zones, 1, 10, 100, 1000, where the address bits for an address to be read into or read out of memory space 200 are stored. Register RI201 includes a fifth zone TO, in which four or more bits are stored to control the type of address that is to be read into or read from memory space 200.

While the apparatus shown in FIG. 2 is a single-address machine, it is to be understood that any other type of machine could have been illustrated in that an instruction register could have been illustrated in which four addresses are written; namely, the address of a first operand, an address of a second operand, an address at which a result is to be stored, and an address of a next instruction.

Four bit outputs 1, 2, 3, and 4 from zones 1, 10, 100 and 1000 of register RI201 are selectively coupled through gates P1, P2, P3 and P4 to four bit zones 1, 10, 100 and 1000 of address register RA202 in response to the signal in zone TO of instruction register RI201 indicating that the program address associated with the value in register RI201 is associated with working zone $P_1 101$ or zone $T_1 114$ of memory space 200. Alternatively, the signals stored in zones 1, 10, 100 and 1000 of instruction register RI201 are selectively coupled to inputs 1, 2, 3, and 4 of binary coded decimal to binary coded hexadecimal converter or transcoder 205 through gates P5, P6, P7 and P8, in response to the signal in zone TO indicating that the program address in register 201 is for user zone $U_1 105$. Transcoder 205 responds to the binary coded decimal input supplied to its inputs to derive a 16 bit hexadecimal output signal that is coupled to address register RA202. The output signal of transcoder 205 is arranged in four segments, each including four bits. Each four bit segment is coupled to a different one of the four bit zones included in address register RA202. In the event that the signals applied to any input terminal of transcoder 205 represent a decimal number having a value in excess of 9, the transcoder derives an output signal at terminal 5 to indicate an overflow state. The derivation of an overflow signal at terminal 5 of transcoder 205 causes the computer with which the memory functions to be locked and the computer to be recycled at its initial starting point.

Gates P1–P4 and P5–P8 are controlled in response to output signals of read-only memory (ROM) 203, which in turn is responsive to the signal in zone TO of register RI201. The first bit in zone TO of register RI201 indicates whether the bits in zones 1, 10, 100 and 1000 of the register are used for addressing subdivision $U_1 105$ or zones $P_1 109$ or $T_1 114$. If the first bit of zone TO has a binary value of 1, the address is for subdivision $U_1 105$, and a binary 1 level is derived on lead ZP and a binary 0 level is derived on lead ZP*, causing gates P5 — P8 to be enabled and gates P1 — P4 to be disabled. In contrast, if the first bit in zone TO of register RI201 is a binary one, read-only memory 203 causes a binary one level to be derived on its output lead ZP* and a binary 0 level to be derived on its output lead ZP, whereby gates P1 — P4 are enabled to the exclusion of gates P5 — P8. Hence, a binary one signal on lead ZP signifies that the address being read from memory space 200 is in connection with a supervisory or user program and is written in binary coded decimal and must be converted to binary coded hexadecimal. In contrast, a binary one signal on lead ZP* signifies that the address is in connection with other operations performed by the system and that the address contained in register RI201 is already in binary coded hexadecimal and does not need conversion.

Address register 202 responds to its input signal to address memory 200 via four four-bit output leads; the output leads for register zones 1 and 10 are denominated as AX, while the output leads of zones 100 and 1000 of register RA202 are denominated as AY. Leads AX and AY are respectively connected to address decoders 213 and 214 that respectively can be thought of as selecting one of the 128 columns and one of the 128 rows of memory space 200 from the binary coded hexadecimal signals loaded in address register RA202. In actuality, the signals in zones 1 and 100 of address register RA202 both assume the binary values 0000 through 1111 (0 through F in hexadecimal), while the signals in zones 10 and 1000 of address register RA202 assume the binary values 000 through 111 (equivalent to the hexadecimal numbers 0 through 7). The signals stored in zones 10 and 100 of address register RA202 are combined in a matrix to derive an output signal for each one of the 64 separate integrated circuit memories included in memory space 200. The signals in zones 1 and 100 of address register RA202 are fed to the 8 input terminals of each of the 64 memories and select a particular address in the selected memory. A one bit word is written into or read out of the selected memory location in response to a command from the computer, in a manner well-known to those skilled in the art.

Thus, in FIG. 2 there are shown on one hand an instruction register RI 201, gates P5-P8 and transcoder 205, connected to addressing register RA 202, for allowing instructions in the user or supervisory programs to be addressed, and on the other hand, gates P1-P4 connected to instruction register RI 201 and to addressing register RA 202, for enabling instructions in the microprogram forming the remainder of the processing system to be addressed.

The circuitry included in transcoder 205 may take several different forms. In one embodiment, transcoder 205 is formed by a programed read-only memory (PROM) which is addressed in binary coded decimal and wherein each address is allotted a corresponding word of the hexadecimal code. For example, the decimal number 1943 having a binary coded decimal code of $$\underline{|0001|1001|0100|0011|}$$
$$\quad\;1\quad\;9\quad\;4\quad\;3$$

is converted by the PROM forming transcoder 205 to a corresponding BCH number, having a value of $$\underline{|0001|0011|0010|1011|}$$
$$\quad\;1\quad\;3\quad\;2\quad\;B$$

Programmable read only memory 205 is fabricated from integrated circuit memory elements having a capacity of 256 four bit words; such elements are available from electronic component manufacturers, and they take the form of a Haris 7448N or a Texas Instruments SN74S 287. To decode the tens and units orders of a decimal number into the tens and units orders of a hexadecimal number, two PROM memory elements, each having a capacity of 256 four bit words are required, although only 100 four bit words are used in each of the elements.

In FIG. 3A there is illustrated a transcoding matrix for converting the decimal numbers 00 through 99 into the hexadecimal numbers 00 through 63 according to the equation $$A_1 10^1 + A_0 10^0 = B_1 16^1 + B_0 16^0$$

wherein $0 \leqq A_1$ and $A_0 \leqq 9$ and $0 \leqq B_1$ and $B_0 \leqq 15$ or F. The horizontal and vertical lines outside of the square matrix respectively represent the units and tens values of decimal input, while the values inside of square 301 represent the hexadecimal conversions. Thus, decimal number 68 corresponds to the intersection of column 8 and row 6, from which the hexadecimal number 44 is read.

In one embodiment, transcoder 205 includes two programmed read-only memories, each having entries as designated by FIG. 3A. One of the programmed read-only memories included in transcoder 205 responds to the units and tens decimal signals coupled through gates P5 and P6, while the other programmed read-only memories respond to the hundreds and thousands decimal indicating signals coupled through gates P7 and P8. The units and tens signals are converted by the first PROM into two four bit binary coded hexadecimal signals that are coupled to output leads 1 and 2 of the transcoder as the lowest and second lowest order signals of the hexadecimal output of the transcoder. The hundreds and thousands signals coupled to input leads 3 and 4 of the transcoder are converted by the second PROM into two four-bit signals derived from leads 3 and 4 and which are respectively indicative of the third and fourth orders of the hexadecimal output signal of the transcoder. If either of the PROM's in transcoder 205 is responsive to a decimal input signal having a value of between 10 and 15, in any order, a binary one overflow indicating signal is derived from terminal 5 of transcoder 205.

To provide a more complete understanding of the functioning of transcoder 205 when it includes two PROM's, assume that zones 1, 10, 100 and 1000 of instruction register RI201 respectively store the decimal values 5, 9, 2 and 5 and that zone TO causes a binary one value to be derived by ROM 203 on lead ZP. In response to the binary values 5 and 9 being coupled to input terminals 1 and 2, respectively, of transcoder matrix 205, the first PROM of the transcoder derives the hexadecimal output signal 5F (at the intersection of 5 and 9, FIG. 3A), whereby the hexadecimal signals F and 5 are derived from output leads 1 and 2 of the transcoder. In response to the decimal indicating signals 2 and 5 being respectively coupled to input terminals 3 and 4 of transcoder 205, the second PROM included in the transcoder derives hexadecimal signals 4 and 3 that are coupled to output leads 3 and 4 of the transcoder. The F, 5, 4 and 3 hexadecimal signals supplied to output leads 1, 2, 3 and 4, respectively of transcoder 205 are respectively fed to zones 1, 10, 100 and 1000 of address register RA202. The hexadecimal 5 and 3 signals in zones 100 and 1000 of address register RA202 cause memory element 35 in memory space 200 to be selected (assuming that the memory elements are ordered so that the elements in the first row of an 8 by 8 matrix are numbered 11-81, the elements in the second row are numbered 12-82 and the elements in the remaining rows are similarly numbered so that the elements in the last row are numbered 18-88). Hence, storing the numbers 3 and 5 in zone 1000 and zone 10, respectively, of address register RA202 causes the memory element in column 3, line 5 of the matrix to be enabled. In response to zones 1 and 100 of address register RA202 respectively storing the hexadecimal numbers F and 4, address 80 in the selected memory element, i.e., memory element 35, is enabled.

If a programming mistake has been made, so that one of zones 1, 10, 100 or 1000 of instruction register 201 derives a binary value of 10 or more (15 is the maximum value that could be derived from one of these zones since four bit binary signals are stored in each of the zones) while a binary one signal is derived on lead ZP, an overflow signal is derived from lead 5 of transcoder 205. This is because a signal applied in excess of 9 to any of the inputs of either of the PROM matrices in transcoder 205 is translated by the PROM into a binary one level that is coupled to output lead 205 of the transcoder. For example, in response to zones 1, 10, 100 and 1000 of instruction register RI201 respectively storing the decimal values 10, 9, 2 and 5, the first PROM in transcoder 205 causes a binary one to be derived at output terminal 5 of the transcoder since the intersection of the units digit 10 and the tens digit 9 is in the region of the matrix outside of square 301. The intersection in the second PROM between 2 and 5 in the units and tens order, at the hexadecimal number 3,4, has no effect on addressing of memory space 200 because the signal at terminal 5 of transcoder 205 causes all operations in the computer and memory system to be terminated and recycled back to an initial starting point for the program.

Figure 3B:
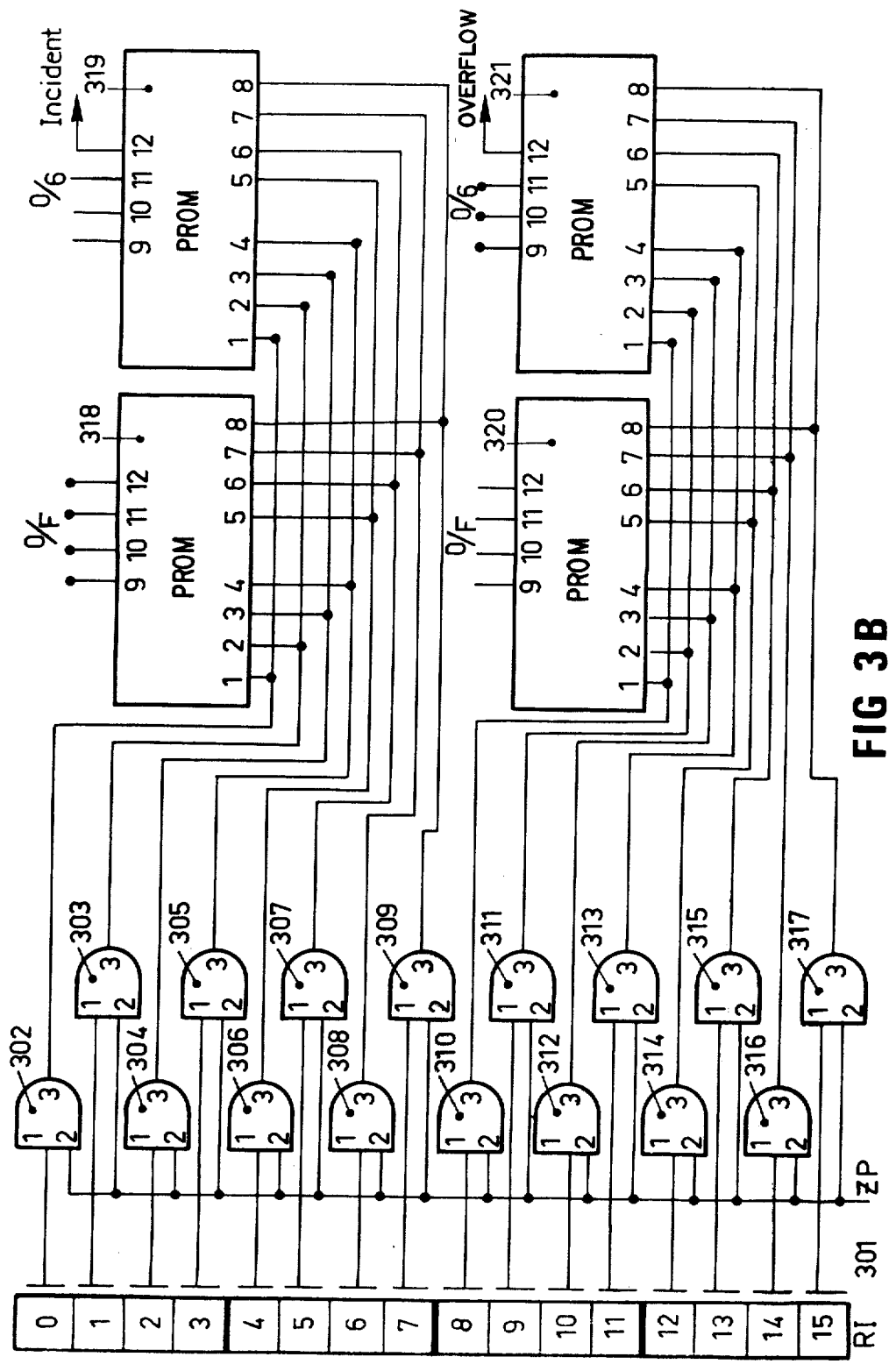

In FIG. 3B there is illustrated a second embodiment of transcoder 205. In the embodiment of FIG. 3B, transcoder 205 includes four programmed read-only memories 318–321, each of which has a capacity of 256 four bit words. In FIG. 3B, there are also illustrated the connections of transcoder 205 to zones 1, 10, 100 and 1000 of instruction register RI201, FIG. 2. Instruction register RI201 is illustrated in greater detail in FIG. 3B and is shown as including 16 bits numbered 0 to 15. The 16 bits are required to address PROM elements 318–321. In elements 318 and 319, the binary bits numbered 0–7 of register RI201 are encoded into hexadecimal units and tens signals, each of which has four bits. Bits 0–7 of register RI201 are coupled through gates 302–309, respectively, to input terminals 1–8 of each of PROM elements 318 and 319 while a binary 1, enabling signal is derived on lead ZP. Each of PROM's 318 and 319 includes four output leads, denominated as 9–12. PROM's 318 and 319 are preprogrammed so that output leads 9–12 of memory 318 derives the units order of a hexadecimal signal that is coupled to zone 1 of address register RA202, while output leads 9–11 of PROM 319 derives the three bits of the second hexadecimal order, which are coupled to zone 10 of address register RA202. Output lead 12 of PROM 319 is an overflow lead on which a binary one signal is derived in response to the inputs to leads 1–4 or 5–8 of PROM 319 being indicative of the decimal numbers 10–15. PROM's 318 and 319 are preprogrammed to derive hexadecimal signals in accordance with the entries within square 301 of FIG. 3A. Thereby, PROM's 318 and 319 perform the same function as the first PROM element of the transcoding matrix discussed in connection with FIG. 3A.

PROM's 320 and 321 have internal circuitry that is identical to PROM's 318 and 319. Input terminals 1–8 of each of PROM's 320 and 321 are respectively responsive to the bits numbered 8–15 of instruction register RI201, as coupled through gates 310–317, respectively, while the signal on lead ZP has a binary 1 value. Each of PROM's 320 and 321 has four output leads 9–12. On output leads 9–12 of PROM 320 are derived four bits of the hexadecimal order coupled to zone 100 of address register 202. On leads 9–11 of PROM 321 are derived the three bits of the hexadecimal order coupled to zone 1000 of address register RA202. In response to the decimal value of the signal coupled to leads 1–4 or 5–8 of PROM 321 being in the range from 10 to 15, a binary 1 signal is derived by PROM 321 on output lead 12 to indicate an overflow condition. The signals derived from output leads 12 of PROM's 319 and 321 are combined, for example, in a wired OR gate, and supplied to output terminal 5 of transcoder 205.

While there have been described and illustrated several specific embodiments of the invention, it will be clear that variations in the details of the embodiments specifically illustrated and described may be made without departing from the true spirit and scope of the invention as defined in the appended claims.

I claim:

1. In combination with a computer,
    the computer including: a first group of addresses for one type of computer instruction, said first group of addresses being represented in the computer as first signals representing numbers in a first base, and a second group of addresses for a second type of computer instruction, said second group of addresses being represented in the computer as second signals representing numbers in a second base, the numerical value of the second base exceeding that of the first base so that all of the addresses of the first base are expressed by numbers that form only some of the numbers of the second base;
    a memory with a portion thereof for storing computer instructions at addresses represented by numbers in the second base;
    means responsive to the first signals for converting the first signals, representing addresses of the first base, into third signals representing addresses of the second base in response to an indication of the one type of computer instructions being read out of or into memory;
    and means selectively responsive to the second and third signals for addressing said memory portion with signals representing numbers only in the second base.

2. The combination of claim 1 wherein the first base is base ten and the second base is greater than ten, said converting means including means for converting the first signals of base ten to the third signals of the second base greater than 10.

3. The combination of claim 2 further including means responsive to the first signal for sensing a value higher than nine being used to represent any order of an address in the first base while the indication of the first type of computer instruction is being derived, and means for preventing addressing of the memory portion in response to said value higher than nine being sensed.

4. The combination of claim 1 further including means responsive to the first signal for sensing a value higher than one less than the numerical value of the first base being used to represent any order of an address in the first base while the indication of the first type of computer instruction is being derived, and means for preventing addressing of the memory portion in response to said sensing of a value higher than one less than the value of the first base.

5. The combination of claim 1 wherein the first and second bases are respectively 10 and 16, said converting means including means for converting the first signals of base 10 to the third signals of base 16.

6. The combination of claim 1 wherein each of the first and second signals includes first and second indications respectively indicative of the first and second signals representing addresses of the first and second groups of addresses, and means responsive to the first and second indications for selectively enabling the addressing means to be responsive to the third and second signals, respectively.

7. The combination of claim 6 further including means responsive to the first signal for sensing a value higher than one less than a numerical value of the base being used to represent any order of an address in the first base while the first indication is being derived, and means for disabling the addressing means in response to said sensing of a value higher than one less than the value of the first base.

* * * * *